(12) United States Patent
Bradley

(10) Patent No.: US 10,451,411 B1
(45) Date of Patent: Oct. 22, 2019

(54) MULTIFUNCTIONAL CENTERING TOOL

(71) Applicant: Katherine Joan Bradley, Keller, TX (US)

(72) Inventor: Katherine Joan Bradley, Keller, TX (US)

( * ) Notice: Subject to any disclaimer, the term of this patent is extended or adjusted under 35 U.S.C. 154(b) by 122 days.

(21) Appl. No.: 15/690,564

(22) Filed: Aug. 30, 2017

(51) Int. Cl.
*G01B 11/27* (2006.01)

(52) U.S. Cl.
CPC .................................. *G01B 11/27* (2013.01)

(58) Field of Classification Search
CPC .......... B43L 13/201; G01B 3/006; G01B 5/14
USPC ...................................... 33/564, 566
See application file for complete search history.

(56) References Cited

U.S. PATENT DOCUMENTS

| | | | | |
|---|---|---|---|---|
| D167,043 S * | 6/1952 | Kintz | | 33/563 |
| 2,993,277 A * | 7/1961 | Felstein | | B43L 13/001 33/1 B |
| 4,461,086 A * | 7/1984 | Segletes | | B43L 13/18 33/1 B |
| 5,511,316 A * | 4/1996 | Fischer | | B26D 3/24 33/1 F |
| 5,577,328 A * | 11/1996 | Kerry, Sr. | | B43L 13/201 33/1 G |
| 7,469,483 B2 * | 12/2008 | Martin | | B25H 7/005 33/520 |
| 8,611,504 B2 * | 12/2013 | Kubiak | | A61B 6/4441 378/164 |
| 8,869,417 B2 * | 10/2014 | Yeh | | A41H 3/002 33/565 |
| 2005/0011079 A1 * | 1/2005 | Sikora, Jr. | | B25H 7/00 33/566 |
| 2006/0277780 A1 * | 12/2006 | Roche | | D05C 1/08 33/653 |
| 2009/0113737 A1 * | 5/2009 | Graham | | A41H 3/01 33/562 |
| 2012/0204437 A1 * | 8/2012 | Nethery | | B43L 7/005 33/566 |
| 2014/0041245 A1 * | 2/2014 | Bennet | | B43L 13/001 33/565 |
| 2015/0337469 A1 * | 11/2015 | Bowman | | D05B 97/12 33/566 |

* cited by examiner

*Primary Examiner* — Yaritza Guadalupe-McCall
(74) *Attorney, Agent, or Firm* — Plager Schack LLP; Mark H. Plager; Kara Verryt

(57) ABSTRACT

A multifunctional centering tool for centering a pattern on a project may include a transparent plate; a pair of angled tool crosshairs applied to the transparent plate; a pair of straight tool crosshairs applied to the transparent plate; a center orifice extending through the transparent plate; a plurality of pattern slots extending through the transparent plate; and a plurality of sticker slots extending through the transparent plate. The centering tool may also include measurement devices and alignment markers. In some embodiments, the centering tool includes a specially designed centering sticker that is removably attached to the transparent plate.

19 Claims, 4 Drawing Sheets

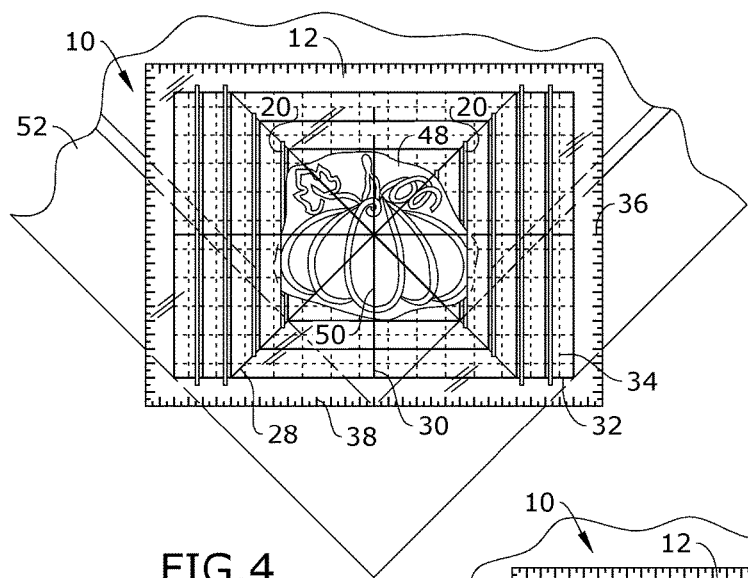
FIG.4
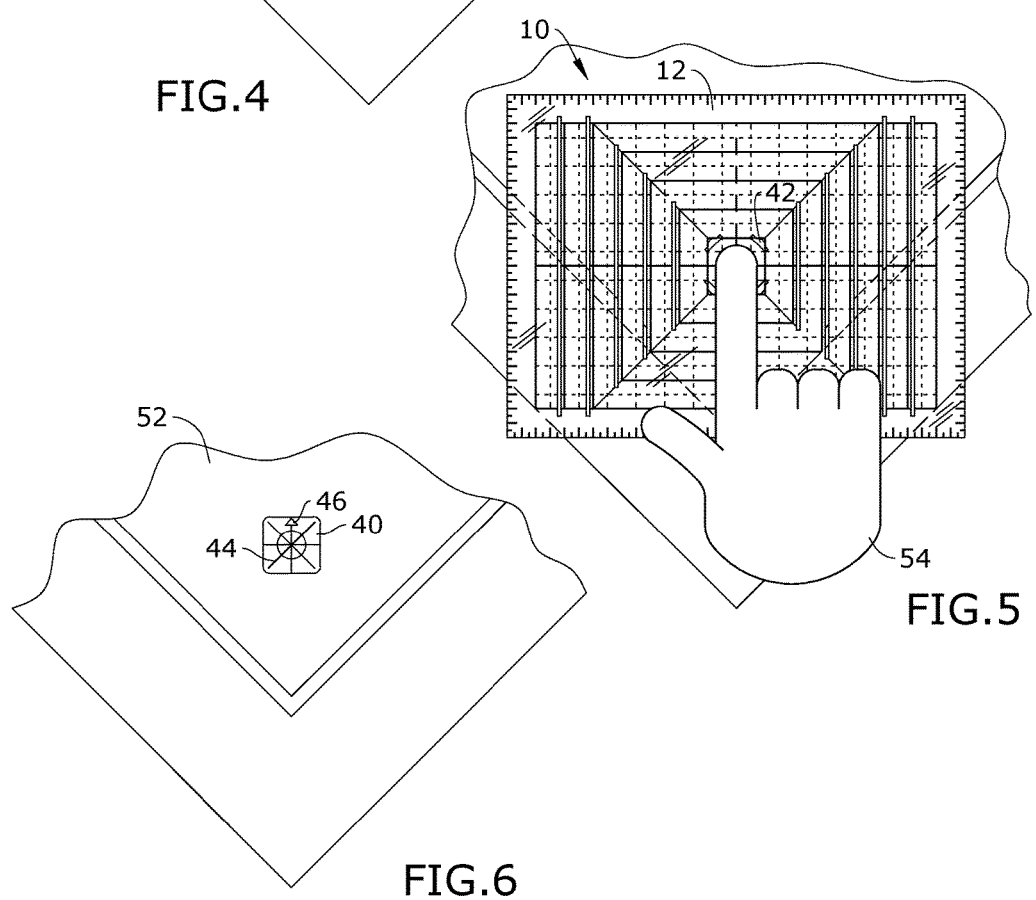
FIG.5
FIG.6

MULTIFUNCTIONAL CENTERING TOOL

BACKGROUND

The embodiments herein relate generally to crafting, and more particularly, to a multifunctional centering tool for centering objects on crafts.

Finding the center of objects for placement or marking can be a difficult and tedious process. Existing tools for helping with centering do not include a structural component for securing a marker to the object or for holding an image of what needs to be centered for placement purposes. Thus, a user cannot easily see where the item needs to be centered or placed on the object.

Therefore, what is needed is a tool for centering an item, such as a design, on an object, wherein the tool releasably holds a marker, holds an image of the item, and assists in finding the center of the an area on the object which will receive the item.

SUMMARY

Some embodiments of the present disclosure include a multifunctional centering tool for centering a pattern on a project. The multifunctional centering tool may include a transparent plate; a pair of angled tool crosshairs applied to the transparent plate; a pair of straight tool crosshairs applied to the transparent plate; a center orifice extending through the transparent plate; a plurality of pattern slots extending through the transparent plate; and a plurality of sticker slots extending through the transparent plate. The centering tool may also include measurement devices and alignment markers. In some embodiments, the centering tool includes a specially designed centering sticker that is removably attached to the transparent plate.

BRIEF DESCRIPTION OF THE FIGURES

The detailed description of some embodiments of the invention is made below with reference to the accompanying figures, wherein like numerals represent corresponding parts of the figures.

FIG. 4 is a top view of one embodiment of the present disclosure, shown in use.

FIG. 5 is a top view of one embodiment of the present disclosure.

FIG. 6 is a top view of one embodiment of the present disclosure.

DETAILED DESCRIPTION OF CERTAIN EMBODIMENTS

Figure 1:
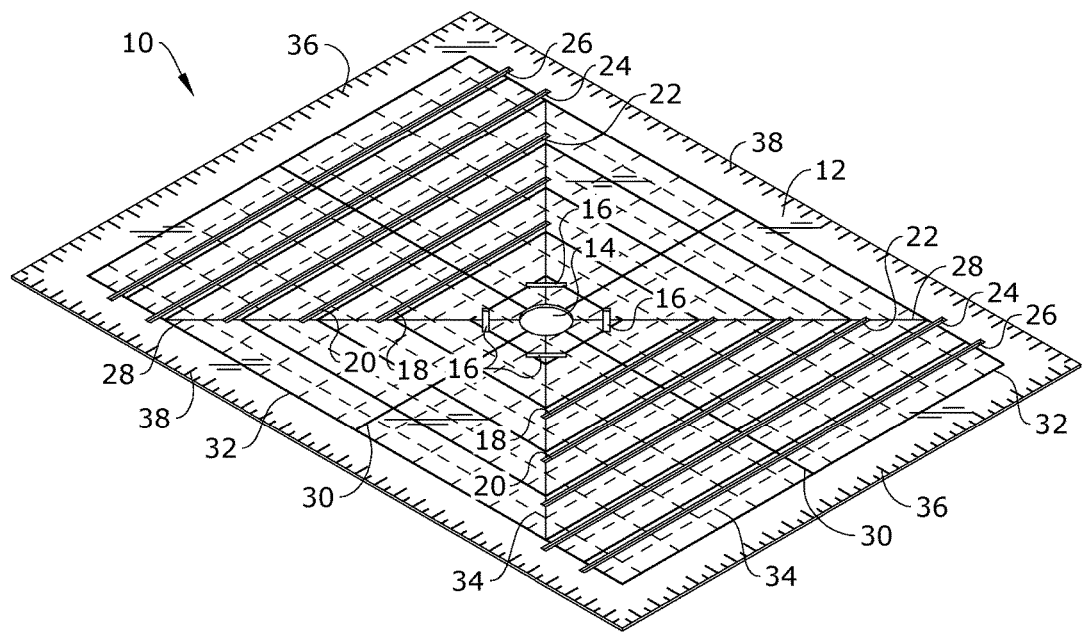
FIG. 1 is a perspective view of one embodiment of the present disclosure.
Figure 2:
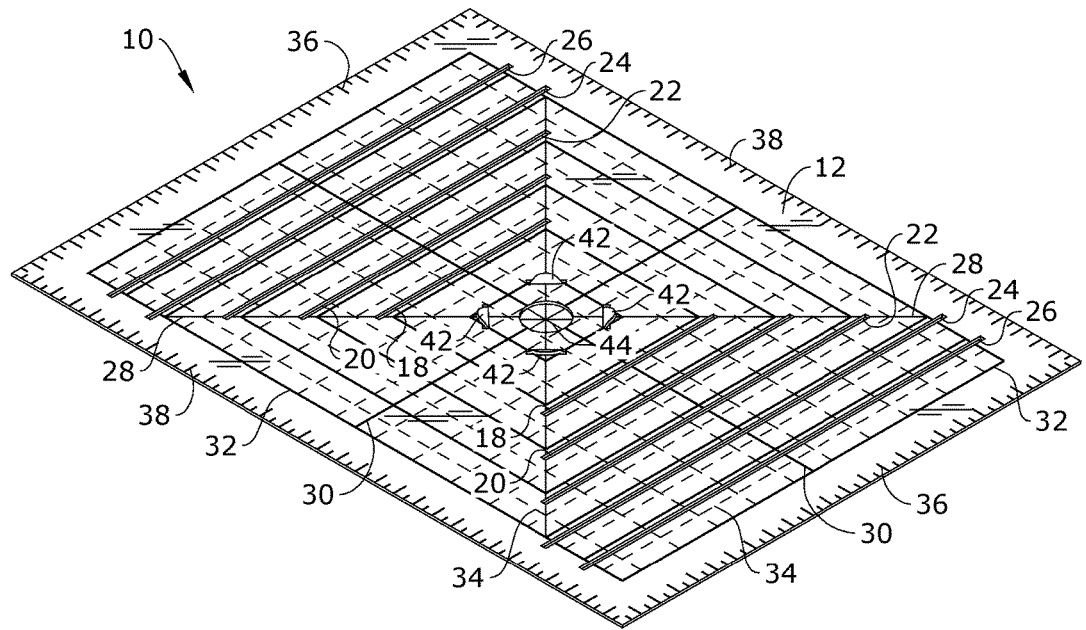
FIG. 2 is a perspective view of one embodiment of the present disclosure.
Figure 3:
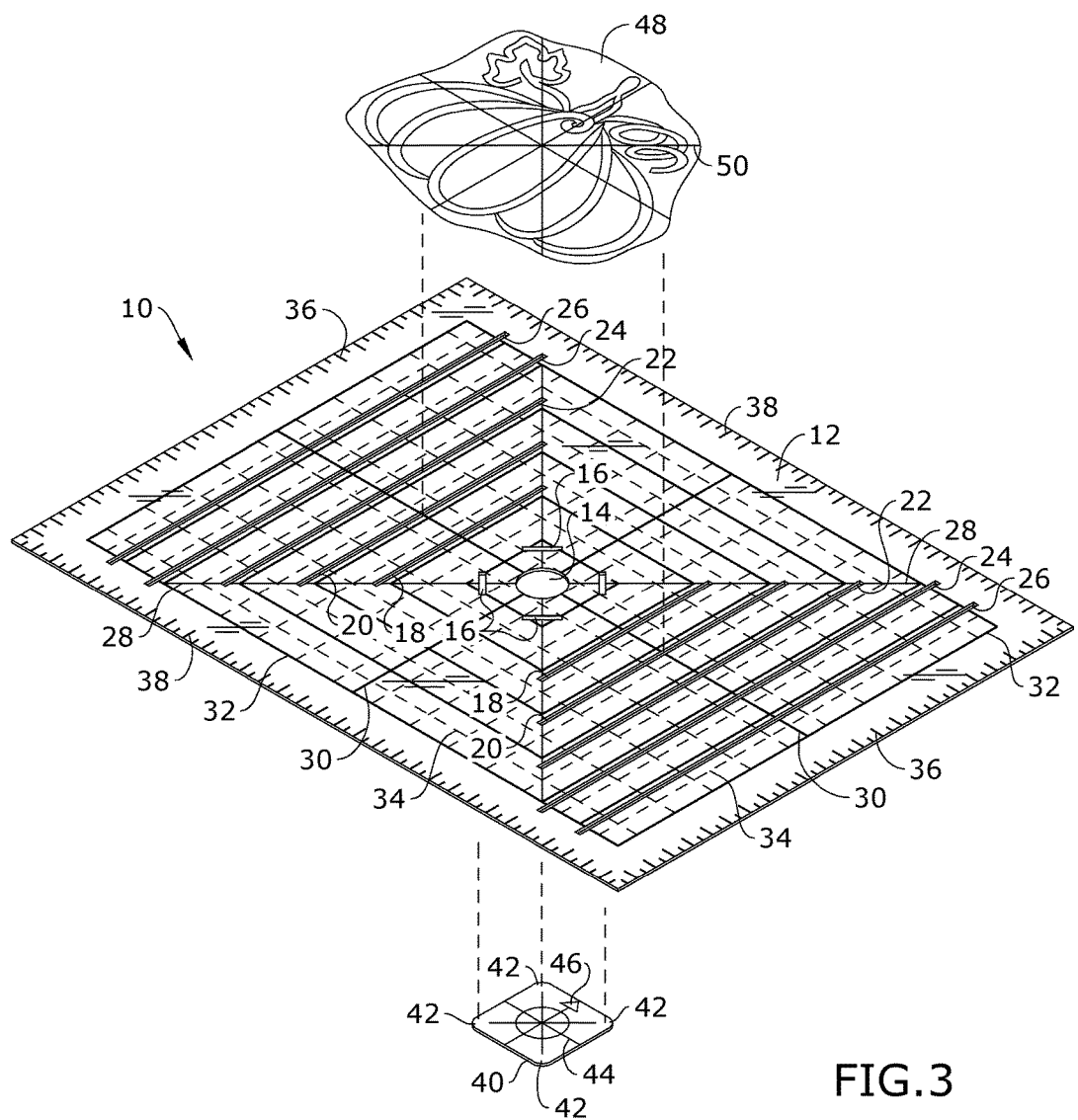
FIG. 3 is an exploded view of one embodiment of the present disclosure.

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as a fashion accessory and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

a. Transparent Plate
b. Centering Orifice
c. Sticker Slots
d. Pattern Slots
e. Crosshairs
f. Edge Rulers
g. Centering Sticker The various elements of the device of the present disclosure may be related in the following exemplary fashion. It is not intended to limit the scope or nature of the relationships between the various elements and the following examples are presented as illustrative examples only.

By way of example, and referring to FIGS. 1-11 some embodiments of the present disclosure include a multifunctional centering tool 10 for centering an item, such as a printed pattern 48, on an object, such as a project 52, the centering tool 10 comprising a transparent plate 12; a pair of angled tool crosshairs 28 applied to the transparent plate 12; a pair of straight tool crosshairs 30 applied to the transparent plate 12; a center orifice 14 extending through the transparent plate 12; a plurality of pattern slots extending through the transparent plate 12; and a plurality of sticker slots 16 extending through the transparent plate 12, wherein the centering tool 10 is designed to removably secure a centering sticker 40 to a project 52, and the centering tool 10 is designed to help visualize a pattern 48 on the project 52.

The angled tool crosshairs 28 may comprise a pair of perpendicular crosshairs, wherein each angled tool crosshair 28 extends from an area proximate to a first corner to an area proximate to an opposite corner. The angled tool crosshairs 28 may help a user to position a pattern 48 or design.

The straight tool crosshairs 30 may comprise a pair of perpendicular crosshairs, wherein each straight tool crosshair 30 extends from an area proximate to a central point on an outer edge to an area proximate to a central point on an opposite outer edge. Thus, the straight tool crosshairs 30 may be parallel to the outer edges of the transparent plate 12.

In embodiments, the plurality of sticker slots 16 may comprise, for example, four sticker slots 16 extending through the transparent plate 12 and surrounding the center orifice 14. The sticker slots 16 may be sized to accommodate the corners 42 of a centering sticker 40, wherein a center region of the centering sticker 40 aligns with the centering orifice 14, which may be, for example, circular in shape.

The plurality of pattern slots may comprise a plurality of pairs of pattern slots, wherein a first and a second of each pair is equally spaced from the center orifice 14 and parallel to one another. For example, the centering tool 10 may comprise a first pair of pattern slots 18 equally spaced from the center orifice 14, and a second pair of pattern slots 20 equally spaced from the center orifice 14, wherein the distance between the first pair of pattern slots 18 and the center orifice 14 is smaller than the distance between the second pair of pattern slots 20 and the center orifice 14. The centering tool 10 may also comprise a third pair of pattern slots 22 equally spaced from the center orifice 14, wherein the distance between the second pair of pattern slots 20 and the center orifice 14 is smaller than the distance between the third pair of pattern slots 22 and the center orifice 14; a fourth pair of pattern slots 24 equally spaced from the center orifice 14, wherein the distance between the third pair of pattern slots 22 and the center orifice 14 is smaller than the distance between the fourth pair of pattern slots 24 and the center orifice 14; a fifth pair of pattern slots 26 equally spaced from the center orifice 14, wherein the distance between the fourth pair of pattern slots 24 and the center orifice 14 is smaller than the distance between the fifth pair of pattern slots 26 and the center orifice 14; and so on. In some embodiments, the pattern slots may also get progressively longer the further away they are located from the center orifice 14.

In some embodiments, an outer edge of the transparent plate 12 may include measuring devices, such as edge rulers, applied thereto. The edge rulers may be used as standard measuring devices to take any required measurement for completing the placement of a pattern 48 or design.

Embodiments of the centering tool 10 may also include solid alignment markers 32 and dashed alignment markers 34 applied to the transparent plate 12. As shown in the Figures, the solid alignment markers 32 may outline progressively smaller shapes, such as rectangles, from an area proximate to the outer edge of the transparent plate 12 to an area proximate to the center orifice 14. The dashed alignment markers 34 and the solid alignment markers 32 may each create a grid on at least a portion of the transparent plate 12. These alignment markers 32, 34 may assist a user in placing the pattern 48 or design.

While embodiments of the centering tool 10 may be used with any desired centering sticker, in some embodiments the centering tool 10 is used with a centering sticker 40 having sticker crosshairs 44 and a sticker arrow 46 printed thereon. The sticker crosshairs 44 may be used to align the centering sticker 40 within the center orifice 14. The sticker arrow 46 may point away from a central area of the centering sticker 40, the use of which may help align a pattern 48 depending on whether it is a horizontal or vertical pattern.

The centering tool 10 of the present disclosure may have any desired shape and, in some embodiments, is substantially rectangular shaped. In such cases, the rectangular shaped transparent plate 12 may include short edge rulers 36 applied along the shorter outer edges of the transparent plate 12 and long edge rulers 38 applied along the longer outer edges of the transparent plate.

The centering tool 10 of the present disclosure may be made of any suitable material, such as a transparent plastic material. The markings, such as the crosshairs, the edge rulers, and the alignment markers, may be applied using any known techniques. For example, the markings may be printed, etched, laser printed, or the like.

Figure 7:
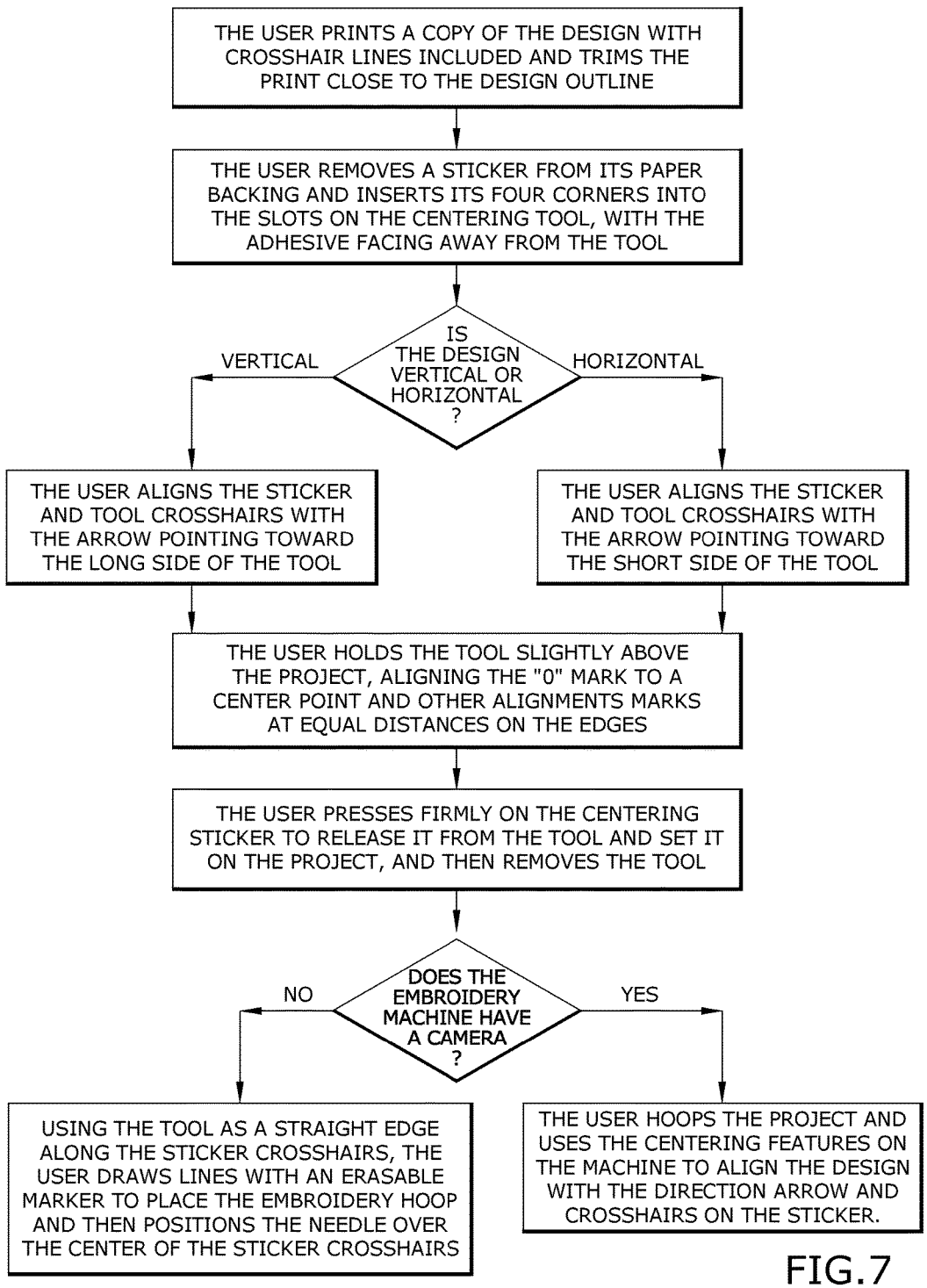
FIG. 7 is a flow chart describing use of one embodiment of the present disclosure.

A flow diagram describing an exemplary use of the centering tool 10 is shown in FIG. 7. As described in FIG. 7 and as shown in the remaining figures, a user 54 may print or otherwise reproduce a copy of the pattern 48 or design with pattern crosshairs 50. The user 54 may trim the print close to the pattern 48 outline. The sticker corners 42 of the centering sticker 40 may be placed into the sticker slots 16 with the adhesive side of the centering sticker 40 facing away from the centering tool 10. The alignment of the centering sticker 40 within the sticker slots 40 may be dependent on the pattern 48 or design. For example, in the case of a rectangular centering tool 10, if the design is a horizontal design, the centering sticker 40 may be inserted such that the sticker arrow 46 points toward the short side of the centering tool 10, while if the design is a vertical design, the centering sticker 40 may be inserted such that the sticker arrow 46 points toward the long side of the centering tool 10. The user may then hold the centering tool 10 slightly above the project 52, aligning the zero "0" mark to a center point and other alignment marks at equal distances on the edges. The user may then press firmly on the centering sticker 40 through the center orifice 14 to release the centering sticker 40 from the centering tool 10 and set it on the project 52. The centering tool 10 may then be removed.

In the case of embroidering, if the user's embroidery machine does not have a camera, the user may use the centering tool 10 as a straight edge along the sticker crosshairs 44 to draw lines with an erasable marker in order to place the embroidery hoop. The machine's needle may then be positioned over the center of the sticker crosshairs 44. Alternatively, if the user's embroidery machine does include a camera, the user may simply hoop the project 52 and use the centering features on the machine to align the design with the sticker arrow 46 and the sticker crosshairs 44.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A multifunctional centering tool for centering a pattern on a project, the centering tool comprising:
    a transparent plate;
    a pair of angled tool crosshairs applied to the transparent plate;
    a pair of straight tool crosshairs applied to the transparent plate;
    a center orifice extending through the transparent plate;
    a plurality of pattern slots extending through the transparent plate; and
    a plurality of sticker slots extending through the transparent plate;
    wherein the plurality of sticker slots comprises four sticker slots extending through the transparent plate and surrounding the center orifice.

2. The multifunctional centering tool of claim 1, further comprising edge rulers applied along an outer edge of the transparent plate.

3. The multifunctional centering tool of claim 1, further comprising solid alignment markers and dashed alignment markers applied to the transparent plate, wherein:
    the dashed alignment markers create a grid on the transparent plate; and
    the solid alignment markers create a grid on the transparent plate.

4. The multifunctional centering tool of claim 1, further comprising a centering sticker designed to removably engage with the plurality of sticker slots.

5. The multifunctional centering tool of claim 4, wherein the centering sticker comprising sticker crosshairs and a sticker arrow printed on the centering sticker.

6. The multifunctional centering tool of claim 1, wherein the plurality of pattern slots comprise:
    a first pair of pattern slots equally spaced from the center orifice; and
    a second pair of pattern slots equally spaced from the center orifice,
    wherein:

a distance between the first pair of pattern slots and the center orifice is smaller than a distance between the second pair of pattern slots and the center orifice.

7. The multifunctional centering tool of claim 6, wherein the plurality of pattern slots further comprise:
third pair of pattern slots equally spaced from the center orifice, wherein the distance between the second pair of pattern slots and the center orifice is smaller than a distance between the third pair of pattern slots and the center orifice;
a fourth pair of pattern slots equally spaced from the center orifice, wherein the distance between the third pair of pattern slots and the center orifice is smaller than a distance between the fourth pair of pattern slots and the center orifice; and
a fifth pair of pattern slots equally spaced from the center orifice, wherein the distance between the fourth pair of pattern slots and the center orifice is smaller than a distance between the fifth pair of pattern slots and the center orifice.

8. The multifunctional centering tool of claim 7, wherein the pattern slots get progressively longer the further away they are located from the center orifice, such that the fifth pattern slots are longer than the first pattern slots, and the first pattern slots are the shortest pattern slots.

9. A multifunctional centering tool for centering a pattern on a project, the centering tool comprising:
a transparent plate;
a pair of angled tool crosshairs applied to the transparent plate;
a pair of straight tool crosshairs applied to the transparent plate;
a center orifice extending through the transparent plate;
a plurality of pattern slots extending through the transparent plate;
a plurality of sticker slots extending through the transparent plate; and
a centering sticker designed to removably engage with the plurality of sticker slots.

10. The multifunctional centering tool of claim 9, wherein the centering sticker comprising sticker crosshairs and a sticker arrow printed on the centering sticker.

11. The multifunctional centering tool of claim 9, further comprising edge rulers applied along an outer edge of the transparent plate.

12. The multifunctional centering tool of claim 9, further comprising solid alignment markers and dashed alignment markers applied to the transparent plate, wherein:
the dashed alignment markers create a grid on the transparent plate; and
the solid alignment markers create a grid on the transparent plate.

13. A multifunctional centering tool for centering a pattern on a project, the centering tool comprising:
a transparent plate;
a pair of angled tool crosshairs applied to the transparent plate;
a pair of straight tool crosshairs applied to the transparent plate;
a center orifice extending through the transparent plate;
a plurality of pattern slots extending through the transparent plate; and
a plurality of sticker slots extending through the transparent plate;
wherein the plurality of pattern slots comprise:
a first pair of pattern slots equally spaced from the center orifice; and
a second pair of pattern slots equally spaced from the center orifice,
wherein:
a distance between the first pair of pattern slots and the center orifice is smaller than a distance between the second pair of pattern slots and the center orifice;
wherein the plurality of pattern slots further comprise:
third pair of pattern slots equally spaced from the center orifice, wherein the distance between the second pair of pattern slots and the center orifice is smaller than a distance between the third pair of pattern slots and the center orifice;
a fourth pair of pattern slots equally spaced from the center orifice, wherein the distance between the third pair of pattern slots and the center orifice is smaller than a distance between the fourth pair of pattern slots and the center orifice; and
a fifth pair of pattern slots equally spaced from the center orifice, wherein the distance between the fourth pair of pattern slots and the center orifice is smaller than a distance between the fifth pair of pattern slots and the center orifice.

14. The multifunctional centering tool of claim 13, wherein the pattern slots get progressively longer the further away they are located from the center orifice, such that the fifth pattern slots are longer than the first pattern slots, and the first pattern slots are the shortest pattern slots.

15. The multifunctional centering tool of claim 13, wherein the plurality of sticker slots comprises four sticker slots extending through the transparent plate and surrounding the center orifice.

16. The multifunctional centering tool of claim 13, further comprising edge rulers applied along an outer edge of the transparent plate.

17. The multifunctional centering tool of claim 13, further comprising solid alignment markers and dashed alignment markers applied to the transparent plate, wherein:
the dashed alignment markers create a grid on the transparent plate; and
the solid alignment markers create a grid on the transparent plate.

18. The multifunctional centering tool of claim 13, further comprising a centering sticker designed to removably engage with the plurality of sticker slots.

19. The multifunctional centering tool of claim 13, wherein the centering sticker comprising sticker crosshairs and a sticker arrow printed on the centering sticker.

* * * * *